May 10, 1932.  B. P. PHELPS  1,857,865
METHOD OF AND APPARATUS FOR UTILIZING HEAT FROM BLOWN OFF BOILER PRODUCTS
Filed Sept. 7, 1929  2 Sheets-Sheet 1
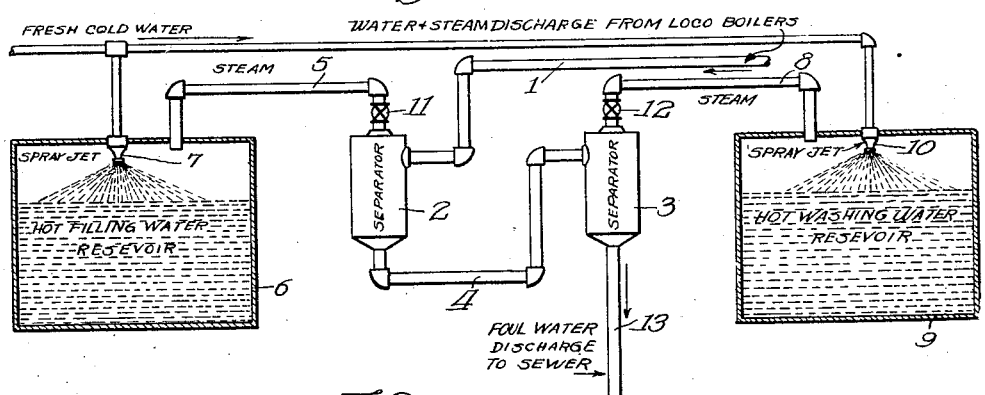
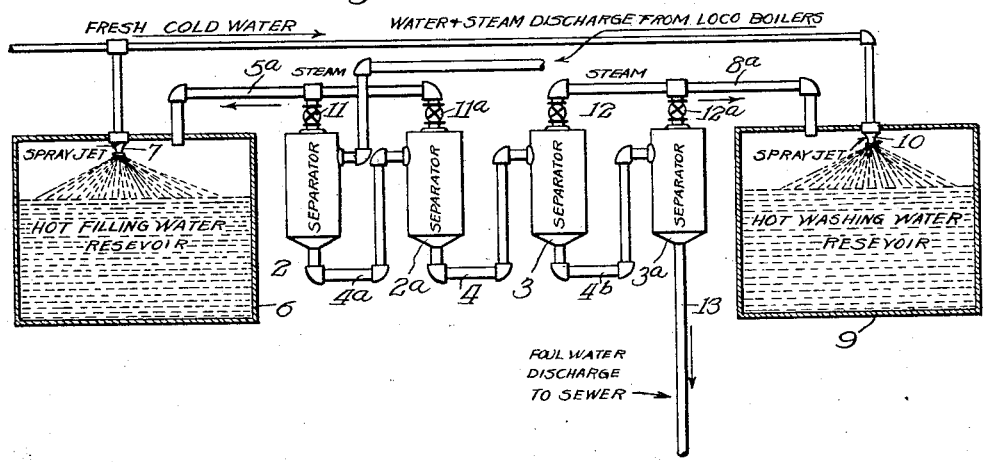
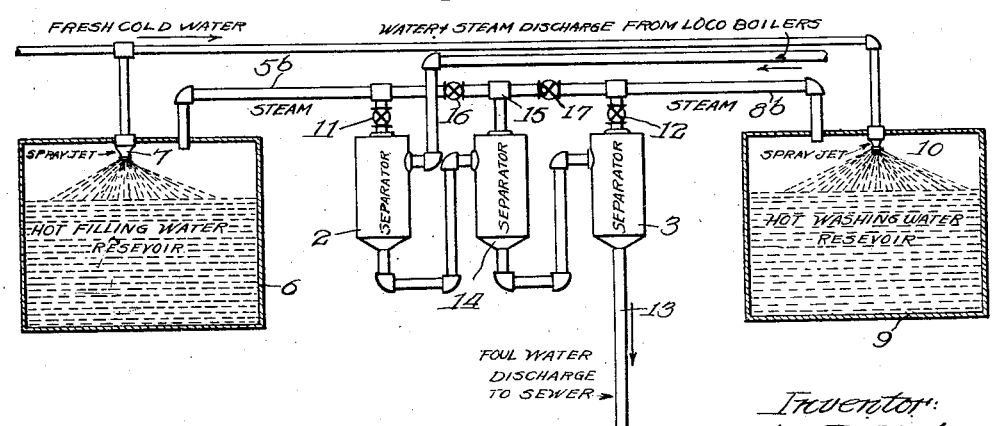
Inventor:
Barton P. Phelps
By Wilkinson, Huxley, Byron & Knight
Attys
Witness:
R. B. Davis Patented May 10, 1932

1,857,865

UNITED STATES PATENT OFFICE

BARTON P. PHELPS, OF TOPEKA, KANSAS

METHOD OF AND APPARATUS FOR UTILIZING HEAT FROM BLOWN OFF BOILER PRODUCTS

Application filed September 7, 1929. Serial No. 391,054.

This invention relates to a method and an apparatus whereby heat from the products blown off from a boiler, such, for instance, as a locomotive boiler, may be made to serve useful purposes in or around the plant, for instance, a locomotive terminal, and particularly purposes having to do with the heat servicing of apparatus requiring different degrees of heat in their operation, for instance, the filling water reservoir and the washing water reservoir of a locomotive blowoff, washout, and refilling apparatus, or one or more of such reservoirs, and a heating or other apparatus requiring heat.

The practice now generally employed in blowing down the boiler of a locomotive, washing out and refilling the boiler, is to separate the blowoff products into volatiles used generally for a heating purpose, such as raising the temperature of boiler filling water, passing the liquid content of the blown off product to a washout tank, and discarding the precipitate of the product. But this practice is objectionable, particularly in certain localities where the water discharged from the locomotive boiler is so highly charged with impurities that it is unsuitable for washing purposes, even after precipitation of the heavier constituent. Moreover, water discharged from the locomotive boiler under pressure and passed to the washout tank is too hot for safe handling by the employees.

In accordance with the present invention, in localities where it is desired to use fresh water for washing boilers as well as refilling them, the minor quantity of the heat constituent of the product discharged from the locomotive boiler is used as an agent for heating one body of water to a temperature suitable for washing purposes, while the major quantity of the heat content of the blown off product is used for heating another body of fresh water to a temperature suitable for filling locomotive boilers; the transfer of the heat content to the respective bodies of water to be heated being effected through the medium of the volatiles of the blown off product as a vehicle; and the proportioning of the heat content delivered to the respective bodies of water being effected by determining the proportion of volatiles flowing toward the respective reservoirs for the said bodies of water, or by having the volatiles for the filling water taken off in advance of and therefore at a somewhat higher temperature than the volatiles taken off for the washout water, or preferably by both regulating the quantity of volatiles and the order of their withdrawal in a manner to transfer the greater proportion of heat units to the filling water. The described regulation of heat transfer through control of volatiles so as to maintain one supply of water at a temperature appropriate for filling purposes and the other supply at a temperature appropriate for boiler washing purposes, or maintaining two bodies of water at different temperatures appropriate for other separate and distinct purposes, is preferably accomplished through the use of a separator comprising at least two and sometimes a greater number of individual separating compartments through which the products blown off from locomotive boilers are discharged, for instance, in series, and having independent separator units connected to the respective reservoirs or other containers of the water to be differentially heated; one separator compartment or unit, if there be but two, being connected to each reservoir, or a group of several of such compartments being connected to one reservoir and a group of like or different number of such compartments being connected to the other reservoir.

The separator compartments will preferably be connected in series in a manner to cause the blown off products to pass through them successively, and where a plurality of compartments are used for accumulating the necessary volume of volatiles for a single reservoir that is to be heated, the volatile escape passages from such a group of compartments may be connected in series with a pipe leading toward such reservoir. Again, the separators which supply the respective reservoirs with the heat units may be controlled as to the volume of volatiles permitted to escape from them; and one or more separator units in a series may be arranged so that it may be thrown into a battery of units supplying one reservoir, or a battery supplying the other reservoir, according as circumstances may require at different times as a measure of insuring sufficient heat in one reservoir while avoiding excessive heat in the other. The volatile escape passages will, of course, extend from upper portions of the separator units preferably where units are connected in a series to receive the blown off products successively, and flow will be from the bottom of an antecedent unit to the upper portion of a succeeding unit; escape of precipitate being through the bottom of an alternate unit.

Control of the supply of heat units upon the dual principle of capacity of the units to deliver volatiles as well as voluntarily selected or regulated discharge of such volatiles, effectively insures the differential heating effect, maintains the two bodies of hot water at temperatures appropriate to their distinctive purposes, and insures maintenance of the right temperature in each body.

In the accompanying drawings, in which several embodiments of the invention are schematically shown by way of illustration—

Figure 1 shows a typical arrangement of two separator compartments receiving blown off products in series and, respectively, supplying heat units through the volatiles of such products, as a vehicle, to a filling water reservoir and a washing water reservoir of a boiler blowoff, washout, and refill system.

Figure 2 is a similar view in which the separators employed for supplying heat to each of the water reservoirs comprise two units each, with the volatile discharge connections of two units connected in series with the volatile supply passage, and with all of the units connected in series for the flow of blown off products through them.

Figure 3 is a detail view of a dual separator comprising three units, of which the intermediate unit is adapted to be thrown into battery or manifold with either the filling water heating unit or the washout water heating unit at will.

Figure 4:
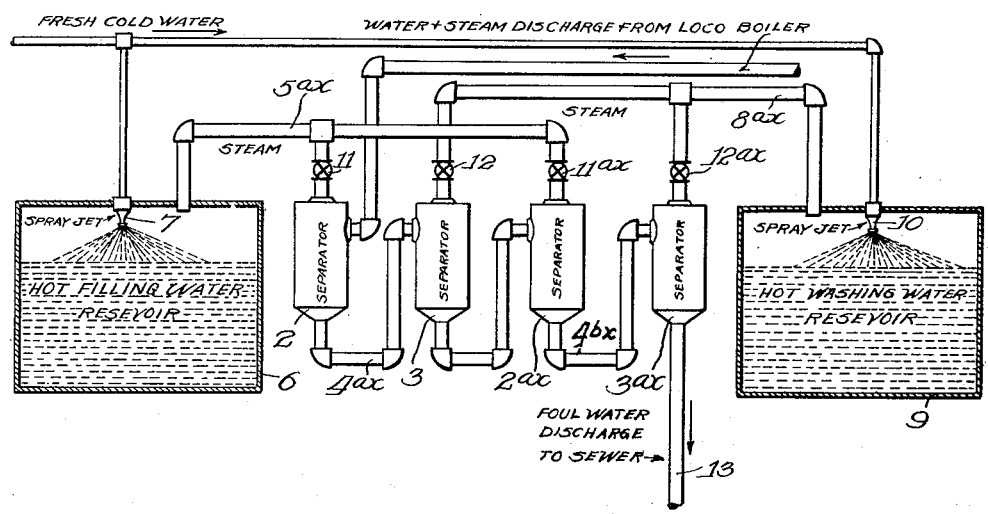
Figure 5:
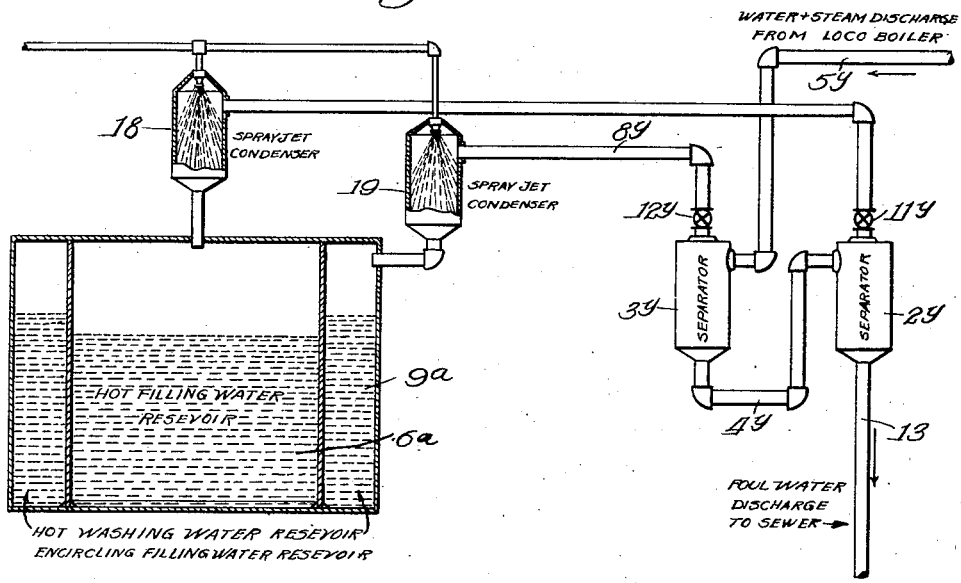

Figure 4 is a view showing two batteries of two separator units each, one battery for the filling water and the other battery for the washout water, and with all the units connected for flow of blown off products through them in series but with the units connected alternately, grouping them so that the first and third units deliver their volatiles to the filling water while the second and fourth units deliver their volatiles to the washout water; and Figure 5 suggests a modification of the system according to which spray condensers, instead of being located in the respective reservoirs, are located in separate condensers between the separators and the reservoirs, and in which figure is also shown an arrangement of filling water reservoir concentrically within the washout water reservoir for the purpose of conserving heat as well as economy in construction.

In Figure 1, 1 represents the pipe through which are received the products blown off from a steam boiler, such, for instance, as the boiler of a locomotive, in a locomotive terminal or boiler washing and filling plant. 2, 3 represent two units which together constitute a separator through which the blown off products are passed, and which units are caused to receive said products successively by their connecting pipe 4 leading from the bottom of unit 2 to the upper portion of unit 3. Unit 2 is connected at top to a pipe 5 that conducts volatiles, separated in said unit, to the upper free space of the filling water reservoir 6, where such volatiles meet condensing spray 7 and fresh cold water in a volume sufficient to condense the volatiles and cause resultant hot water to be added to the contents of said reservoir. Similarly, separator unit 3 is connected at top by a pipe 8 with the washing water reservoir 9, so that volatiles from said unit 3 enter the upper free space of said reservoir where they meet condensing spray 10 of sufficient volume to condense said volatiles and thereby supply an increment of hot water to said washing water tank. Separator units 2 and 3 will be controlled as to the volume of their volatile discharges by means of valves 11 and 12 unless their respective separating capacities or otherwise made appropriate to the different temperatures required for boiler filling water and boiler washing water, or unless the circumstance that the products pass first into the unit 2, where the greater portion of their heat is withdrawn, and thereafter pass at a proportionately reduced temperature into the unit 3, where a lesser quantity of heat is demanded, renders such regulation unnecessary. 13 represents a discharge pipe for the last separator unit in the series through which precipitate and foul water flows.

According to Figure 2, separator unit 2 that heats the filling water reservoir is reinforced by unit 2a in tandem therewith for the flow of blown off products by a pipe 4a, and the flow of volatiles by a pipe 5a, while the separator unit 3 that heats the washing water reservoir is assisted by a unit 3a similarly connected in tandem therewith by pipes 4b and 8a; these two separators, consisting respectively of units 2, 2a, and 3, 3a, being connected by a pipe 4 with the same effect as the separators 2 and 3 of Figure 1. The last unit in this four unit series has a refuse discharge pipe 13 serving the same purpose as the pipe 13 in Figure 1.

According to Figure 3, there is located between the separator unit 2 for the filling water reservoir and the separator unit 3 for the washing water reservoir, an auxiliary separator unit 14, connected in series with said units 2 and 3 both with respect to the flow of blown off products and the flow of volatiles; but its volatile pipe 15 may, through means of valves 16, 17, be closed off from or permitted to communicate with either the pipes 5b or 8b and thereby cause said intermediate unit to assist one or the other of said units 2 and 3 according as the temperature of the reservoir served may require.

According to Figure 4, which employs two separator units for each reservoir, the auxiliary reservoir 2ax which assists the reservoir 2, is the third in a series to receive the blown off products, while the unit 3ax that assists the unit 3 is the fourth of a series, the units thus paired being connected in series by pipes 4ax, 4bx and 5ax, 8ax, with the same purpose and effect as connections established by pipes 4a, 4b and 5a and 8a in Figure 2.

As shown in Figure 5, the separator units, for instance, the units 2y and 3y with their piping 4y, 5y, and 8y, may deliver their volatiles to the filling reservoir 6a and the washing water reservoir 9a indirectly through the condensers 18 and 19, which in turn discharge into said reservoirs; and, as suggested, said reservoirs may be arranged concentrically one within the other for the purpose of economizing in construction and conserving the heat of the filling water reservoir.

In all of the disclosed embodiments of the invention, the separator units will be provided with controlling valves functioning similarly to the volatile controlling valves 11 and 12 of Figure 1; the units 2 and 3 of Figure 2 having said valves 11 and 12; the auxiliary units 2a and 3a in Figure 2 having volatile valves 11a and 12a; the units 2 and 3 in Figure 3 being equipped with valves 11 and 12 as shown while the intermediate unit 14 has two valves 16 and 17 in order that it may be thrown in battery with either of the separator units 2 and 3; the separator units 2 and 3 of Figure 4 having the same valves 11 and 12 while their auxiliary units 2ax 3ax have the valves 11ax, 12ax; and Figure 5 having its two separator units 2y, 3y provided with valves 11y, 12y.

I claim:

1. The method of salvaging heat from products of blown off boilers, which consists in separating, under the inherent heat thereof, the volatiles from each of two separate bodies of said blown off products, thereby obtaining two separate volumes of volatiles containing different quantities of heat and directing said volatiles separately into heating relation to two different bodies of water.

2. In boiler blowoff apparatus, volatile separating means comprising a plurality of separator units delivering different volumes of heat units, means delivering to said separator units products blown off from a boiler, and a plurality of heat absorbing units respectively receiving the heat content of volatiles issuing from the respective separator units.

3. In boiler blowoff apparatus, volatile separating means comprising a plurality of separator units delivering different volumes of heat units, means delivering to said separator units products blown off from a boiler, and a plurality of heat absorbing units comprising boiler filling and boiler washing reservoirs, respectively receiving the heat content of volatiles issuing from the respective separator units; the boiler filling reservoir receiving the greater volume of heat units.

4. In locomotive boiler blowoff apparatus, a plurality of separators, means for delivering blown off products from a boiler to said separators in sequence, a plurality of heat absorbing members separately receiving the volatiles from the respective separators, a container for filling water receiving the heat contents from one of said heat absorbing members, and a container for washout water receiving the heat contents from the other of said separators.

5. In a boiler blowoff apparatus, a plurality of separators, means for delivering blown off products from a boiler to said separators in sequence, a plurality of water heating members having connections through which they receive heat units from the respective separators, and a plurality of independent water storing members having connections through which they receive hot water from the respective heating members.

6. In a boiler blowoff apparatus, a blowoff line, a plurality of separators receiving products from said blowoff line in sequence, independent means conveying volatiles from the respective separators, a plurality of heat absorbing members supplied with volatiles by the respective conveying means, a washing water container receiving heat units from one of said heat absorbing members, and a separate container for filling water receiving heat units from the other of said heat-absorbing members.

7. In boiler blowoff apparatus, a blowoff line adapted to receive products blown off from a boiler, a plurality of separators through which said products are caused to flow in series, independent volatile channels through which the separators, respectively, discharge, and independent heat absorbing units connects with the respective volatile channels.

8. In boiler blowoff apparatus, a blowoff line, a plurality of groups of separators to which said blowoff line delivers in sequence, a volatile channel for each group of separators into which all of the separators of a group deliver, a plurality of heat absorbing members to which said volatile channels, respectively, deliver, a washing water container receiving heat units from one of said absorbing members, and a filling water container receiving heat units from the other of said absorbing members.

9. In boiler blowoff apparatus, a blowoff line, a plurality of groups of separators to which said blowoff line delivers, a volatile channel for each group of separators into which all of the separators of a group deliver, and a plurality of heat absorbing units to which said channels, respectively, deliver; means being provided for varying the number of separators in a group which discharge into the volatile channel.

10. In boiler blowoff apparatus, a blowoff line, a plurality of separators to which said blowoff line delivers in sequence, a plurality of heat absorbing members receiving volatiles from the respective separators, and independent water containers respectively receiving heat units from the respective heat absorbing members.

11. In boiler blowoff apparatus, the combination of a filling water reservoir, a washing water reservoir, separators supplying volatiles to the respective reservoirs, and a blowoff pipe adapted to receive blown off products from a boiler and deliver the same to said separators in sequence; there being for each of said reservoirs means for developing a condensing spray in position to condense the volatiles flowing toward said reservoir.

12. In boiler blowoff, washout, and refill apparatus, a filling water reservoir, a washing water reservoir, a plurality of separators, independent means for delivering volatiles from the respective separators to the respective reservoirs, and means for receiving blown off products from a boiler and passing the same through said separators in series; said products being delivered first to the separator from which volatiles flow to the filling water reservoir.

Signed at Chicago, Illinois, this 31st day of August, 1929.

BARTON P. PHELPS.